United States Patent
Harald et al.

(10) Patent No.: US 8,781,318 B2
(45) Date of Patent: Jul. 15, 2014

(54) DATA PROCESSING IN AN OPTICAL NETWORK

(75) Inventors: Rohde Harald, München (DE); Treyer Thomas, München (DE)

(73) Assignee: Xieon Networks S.a.r.l., Luxembourg (LU)

( * ) Notice: Subject to any disclaimer, the term of this patent is extended or adjusted under 35 U.S.C. 154(b) by 101 days.

(21) Appl. No.: 13/391,456

(22) PCT Filed: Aug. 3, 2010

(86) PCT No.: PCT/EP2010/061295
§ 371 (c)(1),
(2), (4) Date: Feb. 21, 2012

(87) PCT Pub. No.: WO2011/020697
PCT Pub. Date: Feb. 24, 2011

(65) Prior Publication Data
US 2012/0155863 A1    Jun. 21, 2012

(30) Foreign Application Priority Data

Aug. 21, 2009  (EP) .................................... 09010758

(51) Int. Cl.
*H04B 17/00*    (2006.01)
*H04J 14/08*    (2006.01)

(52) U.S. Cl.
USPC ............................................. 398/36; 398/99

(58) Field of Classification Search
USPC ........... 398/9–38, 58, 93, 123, 137, 162, 206, 398/209, 213, 99; 370/445, 447
See application file for complete search history.

(56) References Cited

U.S. PATENT DOCUMENTS

| | | | | |
|---|---|---|---|---|
| 4,646,361 A * | 2/1987 | Usui | ................................ | 398/62 |
| 4,894,819 A * | 1/1990 | Kondo et al. | ................... | 398/99 |
| 5,483,368 A * | 1/1996 | Ohshima | ......................... | 398/79 |
| 5,673,129 A * | 9/1997 | Mizrahi | ......................... | 398/95 |
| 5,861,975 A * | 1/1999 | Sakuyama et al. | ............. | 398/196 |
| 5,896,213 A * | 4/1999 | Nagahori et al. | ............. | 398/100 |
| 6,055,078 A * | 4/2000 | Chen et al. | ...................... | 398/79 |
| 6,088,142 A * | 7/2000 | Cao et al. | ........................ | 398/95 |
| 6,233,261 B1 * | 5/2001 | Mesh et al. | ............... | 372/29.012 |
| 6,339,487 B1 * | 1/2002 | Gnauck et al. | .................. | 398/42 |

(Continued)

FOREIGN PATENT DOCUMENTS

WO    WO 03/081812 A1    10/2003

OTHER PUBLICATIONS

Kim, S-Y, et al., "Simultaneous Beat-Frequency Locking of Conventional and Ultra-Dense WDM Channels Using a Modulated Tunable-Laser Source", Electronics letters, Jun. 24, 2004, vol. 40, No. 13, 2 pgs.

*Primary Examiner* — Ken Vanderpuye
*Assistant Examiner* — Dibson Sanchez
(74) *Attorney, Agent, or Firm* — Nelson Mullins Riley & Scarborough LLP (57) ABSTRACT

A method and an optical component for data processing in an optical network are provided, wherein two sets of wavelengths are allocated; wherein at least one set of wavelengths is monitored; and wherein a collision between the two sets of wavelengths is avoided or compensated by adjusting at least one laser of an optical component. Furthermore, an optical communication system is suggested including said optical component.

14 Claims, 6 Drawing Sheets

(56) References Cited

U.S. PATENT DOCUMENTS

| | | | |
|---|---|---|---|
| 6,661,974 B1* | 12/2003 | Akiyama et al. | 398/95 |
| 6,684,031 B1* | 1/2004 | Kogelnik et al. | 398/99 |
| 6,771,908 B2* | 8/2004 | Eijk et al. | 398/66 |
| 6,868,200 B2* | 3/2005 | Kimotsuki et al. | 385/24 |
| 6,870,836 B1* | 3/2005 | Dyke et al. | 370/355 |
| 6,915,079 B1* | 7/2005 | Unitt et al. | 398/99 |
| 6,954,593 B1* | 10/2005 | Fuse | 398/154 |
| 7,016,608 B1* | 3/2006 | Ball et al. | 398/71 |
| 7,149,425 B2* | 12/2006 | Gripp et al. | 398/34 |
| 7,389,048 B2* | 6/2008 | Kani et al. | 398/72 |
| 7,536,104 B2* | 5/2009 | Dotaro et al. | 398/58 |
| 8,014,672 B2* | 9/2011 | Suzuki et al. | 398/69 |
| 8,457,495 B2* | 6/2013 | Mizutani et al. | 398/70 |
| 8,488,965 B2* | 7/2013 | Mizutani et al. | 398/66 |
| 2003/0072060 A1 | 4/2003 | Sourani | 359/172 |
| 2004/0136720 A1* | 7/2004 | Mahowald et al. | 398/135 |
| 2006/0115271 A1* | 6/2006 | Hwang et al. | 398/72 |
| 2008/0050115 A1* | 2/2008 | Ikai et al. | 398/31 |
| 2008/0085118 A1* | 4/2008 | Effenberger | 398/82 |
| 2008/0267627 A1* | 10/2008 | Effenberger | 398/72 |
| 2008/0298417 A1* | 12/2008 | Atkins et al. | 372/50.22 |
| 2010/0111533 A1* | 5/2010 | Beckett et al. | 398/68 |
| 2010/0220994 A1* | 9/2010 | Pradzynski et al. | 398/1 |
| 2011/0085795 A1* | 4/2011 | Ozaki | 398/25 |
| 2011/0129227 A1* | 6/2011 | Wen et al. | 398/82 |

* cited by examiner

DATA PROCESSING IN AN OPTICAL NETWORK

The invention relates to a method and to a device for data processing in an optical network and to an optical network comprising such a device.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

The PON has been standardized and it is currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options enable the extension of the usable wavelengths to the L-band, more or less doubling these numbers.

Optical access networks, e.g., a coherent Ultra-Dense Wavelength Division Multiplex (UDWDM) network, are deemed to be the future data access technology.

Within the UDWDM concept, potentially all wavelengths are routed to each ONU. The respective wavelength is selected by the tuning of the local oscillator (LO) laser at the ONU.

Figure 1:
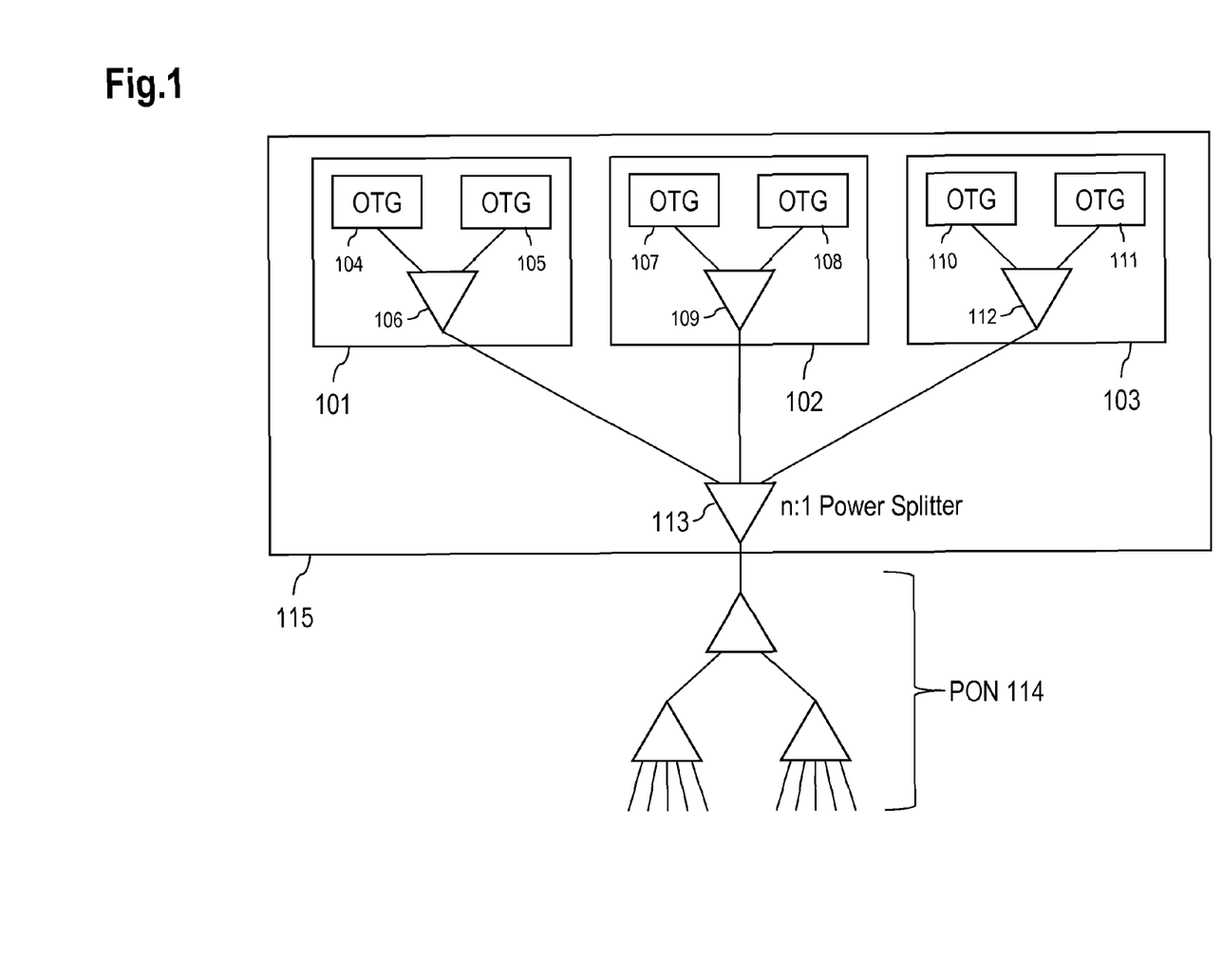
FIG. 1. Shows a conventional UDWDM optical access system deployed with an OLT.

FIG. 1 shows a UDWDM optical access system deployed with an optical line terminal (OLT) 115. The OLT 115 comprises three linecards (also referred to as line interface card, LIC) 101, 102, 103. The linecard 101 comprises two optical transmission groups (OTGs) 104, 105 that are connected to a splitter 106 and the output of the splitter 106 is connected to a power splitter 113. Accordingly, OTGs 107, 108 of the LIC 102 are combined via a splitter 109 towards said power splitter 113 and OTGs 110, 111 of the LIC 103 are combined via a splitter 112 towards said power splitter 113. The power splitter 113 is connected to a PON 114.

Figure 2:
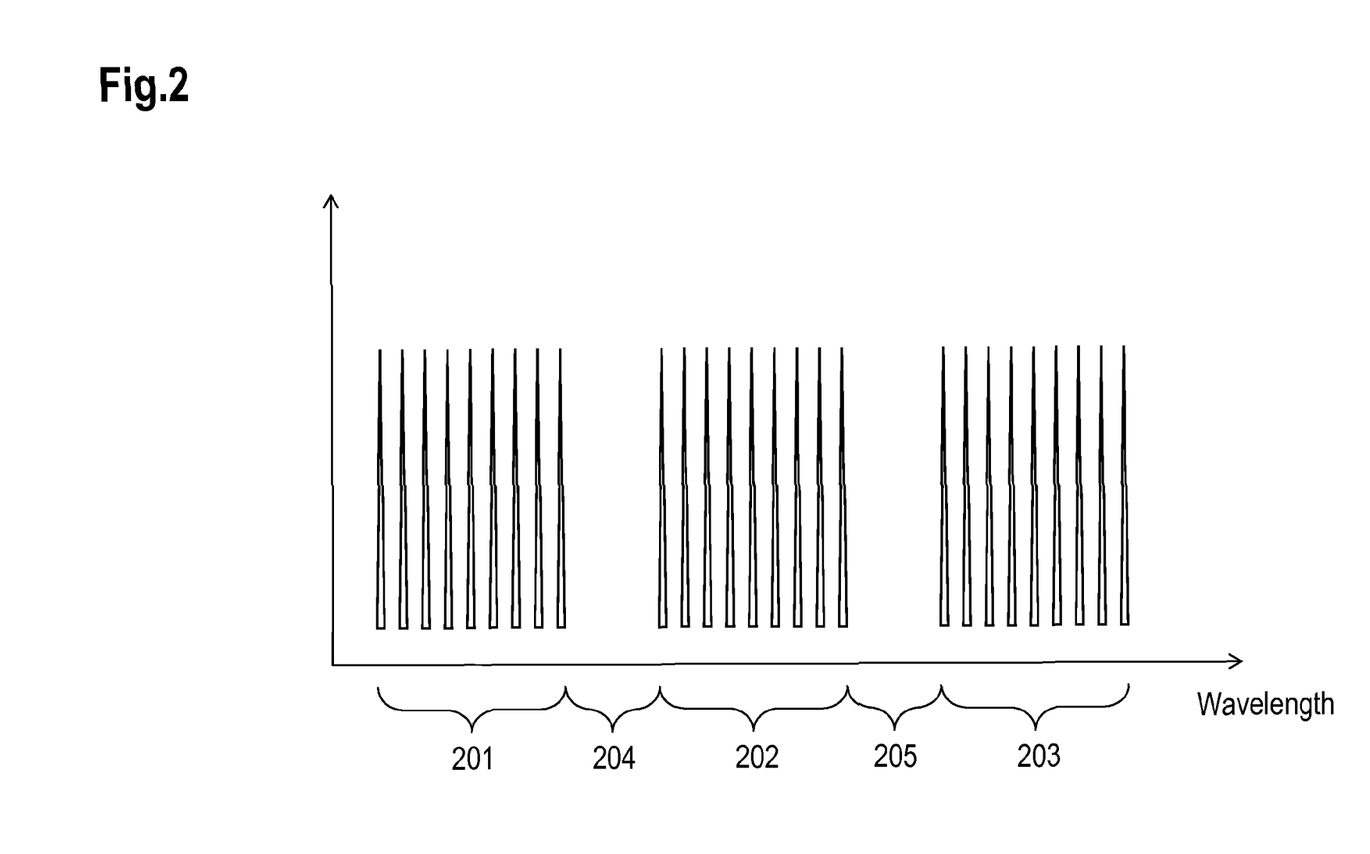
FIG. 2. Shows a diagram of an optical spectrum for a combination of OTG's.

Each OTG generates several wavelengths. FIG. 2 shows a diagram of an optical spectrum comprising a combination of OTGs, wherein a set of wavelengths 201 is generated by a first OTG, a set of wavelength 202 is generated by a second OTG and a set of wavelengths 203 is generated by a third OTG. Wavelengths from several OTGs can be combined onto a single fiber. Also, wavelengths from several LICs can be combined onto a single fiber. The wavelengths of the OTGs are separated by guard bands 204, 205 allowing frequency drifts of each set of wavelengths 201, 202, 203 without interference with its adjacent group of wavelengths.

A single UDWDM system may serve more than 1000 subscribers, but due to today's technology, an OTG in an OLT may be capable of handling only a significantly smaller amount of subscribers. Therefore, multiple OTGs are required to cope with a larger number of subscribers in a PON. As indicated in FIG. 1, the OTGs are combined by the power splitter 113.

The wavelengths processed by one OTG may not overlap the wavelengths of another OTG in the same PON. Therefore, every OTG needs a laser with a different wavelength. Hence, either tunable linecards (i.e. linecards with tunable lasers) are needed or different types of linecards are required to meet this requirement. Tunable linecards are a promising option, as they avoid high operational expenditure (OPEX): Hence, there is no need for managing multiple types of linecards with one particular linecard type for each wavelength range.

Low-cost tunable lasers could be used in the linecards to make them adjustable to wavelengths and at the same time meet the requirement for an overall cost efficiency of such linecards. However, such low-cost tunable lasers show a significant degree of drift and tolerances. Such drift may result in one OTG colliding with the wavelength range of another OTG (collision of wavelength ranges of different OTGs) and the signals of both OTGs would thus be degraded leading to a service disruption that may be perceivable for the subscribers.

The problem to be solved is to overcome the disadvantages stated above and in particular to provide a cost-efficient solution to (at least partially) compensate tolerances and drifts of a laser in an optical component.

This problem is solved according to the features of the independent claims. Further embodiments result from the depending claims.

In order to overcome this problem, a method for data processing in an optical network is provided,
  wherein two sets of wavelengths are allocated;
  wherein at least one set of wavelengths is monitored;
  wherein a collision between the two sets of wavelengths is avoided or compensated by adjusting at least one laser of an optical component.

It is noted that adjusting the laser may in particular include adjusting a wavelength of said laser. The laser may be used as a local oscillator laser, in particular a CW laser, of the optical component.

It is further noted that a set of wavelengths may be monitored by monitoring a wavelength range or frequency band around this set of wavelengths. The breadth of such band can be defined according to a band gap that is required to avoid any collision between several sets of wavelengths. For example, if the breadth of the band is set to a particular size, an imminent collision can be detected once the sets of wavelengths approach each other and the gap between those sets runs below said size.

A set of wavelengths may comprise at least one wavelength range or band that can be used for communication purposes. In particular, in UDWDM, a number of wavelengths can be used as one such set of wavelengths, wherein all wavelengths of this group are generated by a single laser. Hence, shifting the laser's wavelength results in shifting all wavelengths of this set of wavelengths. The set of wavelengths may in particular be provided by an optical transmission group (OTG), wherein at least one such OTG can be deployed with a linecard of an ONU or an OLT.

It is noted that wavelength range may refer to any continuous or non-continuous band of wavelengths or frequencies that may be utilized for communication purposes.

Advantageously, prior to an actual collision, a drift of the sets of wavelengths towards (or apart from) each other can be detected. If this is the case, the collision can be avoided by tuning one of the laser thereby adjusting the wavelengths of the set of wavelengths that is associated with this laser. The collision can be detected, e.g., if the distance between two sets of wavelength falls below a predetermined threshold (gap band).

It is noted that this approach effectively avoids collisions before they may actually occur. In addition, a collision that actually happens may effectively be reduced or compensated by adjusting said at least one laser. Hence, the collision being avoided refers to the scenario when the collision will not occur as the adjustment is timely made prior to the collision as well as to the scenario when the collision occurs, but is (quickly) reduced or compensated by adjusting the at least one laser of the optical component.

Hence, there is no need for additional components that provide temperature control or wavelength control of the laser. It is also an advantage that there is no need for guard bands larger than the sum of all tolerances and drifts, thus an overall waste of bandwidth is significantly reduced.

It is additionally noted that the ONUs may follow the downstream wavelengths.

In an embodiment, the optical component is or is associated with one of the following:
an OLT;
an ONU;
An OTG.

In another embodiment, each set of wavelengths is associated with one laser of an optical component, in particular with an optical transmission group (OTG).

In a further embodiment, the collision is avoided or compensated by determining an optical gap between the at least two sets of wavelengths and by adjusting at least one laser of an optical component when the optical gap reaches a predetermined threshold.

Hence, when the optical gap (also referred to as band gap between the sets of wavelengths) falls below this predetermined threshold, the laser of the optical component is tuned such that a minimum optical gap between the sets of wavelengths is complied with.

Advantageously, a collision can be detected in advance and a countermeasure can be taken before the actual collision. This effectively avoids any collision between sets of wavelengths to occur.

In a next embodiment, a downstream laser signal of the optical component is mixed with an upstream light of at least one adjacent optical component and a collision detection signal is determined by the optical component based on this mixed signal.

Hence, the collision detection signal allows detection of light at a wavelength larger than the wavelength range occupied by the set of wavelengths of the optical component and may indicate a collision (or an imminent collision) when a further set of wavelengths approaches this set of wavelengths.

The downstream laser signal is in particular an unmodulated laser signal.

It is also an embodiment that downstream laser signals of several optical components are mixed to a collision detection signal.

Pursuant to another embodiment, said collision detection signal is fed to a centralized collision detection device.

According to an embodiment, several centralized collision detection devices are provided in parallel, in particular for shared processing and/or for redundancy purposes.

Whenever two sets of wavelengths (e.g. provided by two OTGs) collide (or such collision is imminent), the collision detection signal indicates an intermediate frequency corresponding to an optical distance of both sets of wavelengths. The collision can be detected and signaled by the collision detection device.

According to another embodiment, an optical network unit scans downstream signals of several sets of wavelengths and determines a collision detection signal.

It is noted that such ONU may be construed and/or set up to scan for downstream signal In yet another embodiment, the optical network unit determines a distance between two adjacent wavelengths of a set of wavelengths and a distance between two sets of wavelengths and determines a collision if the distance between the two sets of wavelengths is less than the distance between two adjacent wavelengths of the set of wavelengths.

Again, an imminent collision can be detected as well, e.g., by including a safeguard gap band (added to the distance between two sets of wavelengths) and therefore triggering a collision avoidance sequence prior to the actual collision occurrence.

According to a next embodiment, the optical network unit transmits the collision detection signal upstream to an optical access point, in particular to an optical line termination.

There are several possibilities to transfer said collision detection signal towards the optical access point: The ONU may utilize a free or reserved wavelength or it may use a separate channel, e.g., a connection over a different network like the Ethernet.

Pursuant to yet an embodiment, a downstream laser signal of the optical component is mixed with a downstream light of at least one adjacent optical component and wherein a collision detection signal is determined by the optical component based on this mixed signal.

The collision detection signal may comprise an intermodulation between the laser signal and the downstream signals of the at least one adjacent optical component. As an alternative, the collision detection signal may comprise an inter-modulation between different sets of wavelengths of the at least one adjacent (or other) optical component.

Pursuant to yet an embodiment, the two sets of wavelengths comprise a first set of wavelengths that is associated with a first laser and a second set of wavelengths that is associated with a second laser; and the second set of wavelengths is tuned via the second laser towards the first set of wavelengths.

Hence, the second laser can be tuned to iteratively or continuously move the second set of wavelengths towards the first set of wavelengths. This bears the advantage that the set of wavelengths will allow for a compact and efficient utilization of the wavelength range maintaining at least a predetermined band gap between the first set of wavelengths and the second set of wavelengths, said band gap avoiding any collision.

The problem stated above is also solved by a device comprising and/or being associated with a processing unit and/or a hard-wired circuit and/or a logic device that is arranged such that the method as described herein is executable thereon.

Also, the problem stated above can be solved by an optical component comprising
a local oscillator laser emitting a set of wavelengths;
a processing unit that is arranged
for monitoring the set of wavelengths;
for adjusting the local oscillator laser in case the set of wavelengths collides or is about to collide with another set of wavelengths.

It is noted that said monitoring of the set of wavelengths may comprise monitoring a wavelength range around this set of wavelengths to become aware of an imminent collision before this collision actually occurs.

The embodiments described above apply to this optical component as well.

The problem stated supra is further solved by an optical communication system comprising at least one optical component as described herein.

The approach provided allows using tunable lasers in an optical linecard without any need for a temperature control. The mechanism described here allows the linecard lasers to drift as long as a wavelength range of a specific OTG does not reach or interfere with a wavelength range of an adjacent OTG. In case the wavelength ranges of OTGs drift towards each other, an imminent collision can be detected and at least one OTG can be tuned slightly to avoid such collision.

Several exemplary approaches are suggested to detect the collision in advance. These approaches can be summarizes as follows and will be described in further detail hereinafter.

(a) An unmodulated downstream laser signal of an OTG is mixed with an upstream light of at least one neighboring OTG to detect a collision.
(b) An unmodulated downstream laser signal of several (in particular of all) OTGs are combined or mixed in a centralized collision detector.
(c) A dedicated ONU scans (all) downstream signals of (all) OTGs and detects the relative position of the OTGs.
(d) An unmodulated downstream laser signal of an OTG is mixed with a downstream light of at least one neighboring OTGs to detect a collision.

It is noted that the approaches (a) to (d) can be applied separately or in combination(s) with each other.

Approach (a)

This mechanism assumes that any linecard has either at least one active subscribers or is powered down.

An OTG can serve k wavelengths, i.e. k subscribers. If less than k subscribers are active in a specific PON, a single OTG is powered up. In this case no collision with further OTGs occur and the laser of the linecard may be tuned to an upper (or a lower) end of its wavelength tuning range.

When a subscriber occupies the last available wavelength of the first OTG, the OLT activates the next OTG. This new OTG may utilize wavelengths at the opposite end of the wavelength tuning range and it may be tuned towards the first OTG.

The new OTG may continuously monitor collisions and it may stop tuning when a collision is detected or imminent. At this wavelength range (prior to such a collision to occur), the new OTG has found its wavelength range and starts accepting login events from ONUS.

For such purpose, each OTG comprises a Collision Detection Device (CDD), which may be part of the multi-channel-receiver of the OTG.

Figure 6:
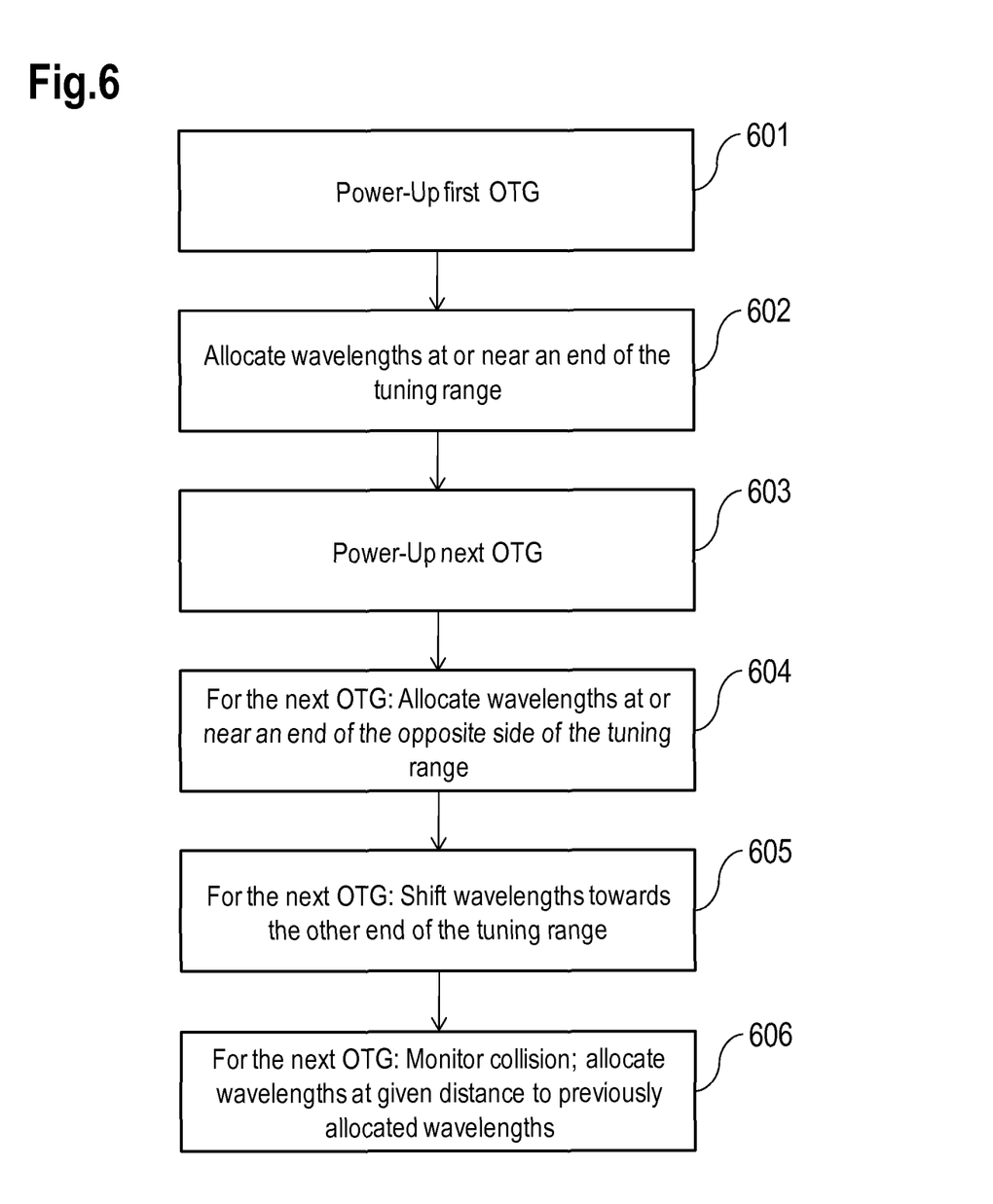
FIG. 6 shows steps of a method that can be applied to efficiently utilize a bandwidth range by several optical components, e.g., OTGs.

FIG. 6 shows steps of a method that can be applied to efficiently utilize a bandwidth range by several optical components, e.g., OTGs.

In a step 601 a first OTG is powered up. This first OTG allocates a set of wavelengths (a wavelength range or band) at or near an end of a tuning range (step 602). This could be at the upper or lower end of the available band. The first OTG may then utilize this set of wavelengths by allowing ONUS to log onto it. In a step 603, a next (here: second) OTG is powered up. In order to initially avoid any overlap of the set of wavelengths used by this second OTG with the set of wavelengths already allocated by the first OTG, the second OTG allocates a set of wavelengths at or near an opposite side of the tuning range (step 604). The second OTG may then shift the set of wavelengths (by tuning its laser) towards the other end of the tuning range (step 605). Before actually colliding with the set of wavelengths allocated by the first OTG, the second OTG (e.g., via its CDD) detects an imminent collision (e.g., approaching the set of wavelengths of the first OTG by falling below a band gap of 3 GHz). Hence, the predetermined band gap between the sets of wavelengths can be used to efficiently utilize the tuning range. The second OTG utilizes these wavelengths that are close to the set of wavelengths of the first OTG, but sufficiently remote to avoid any interference or collision. Hence, the second OTG may allow ONUS to log onto the wavelengths allocated (step 606).

Figure 3:
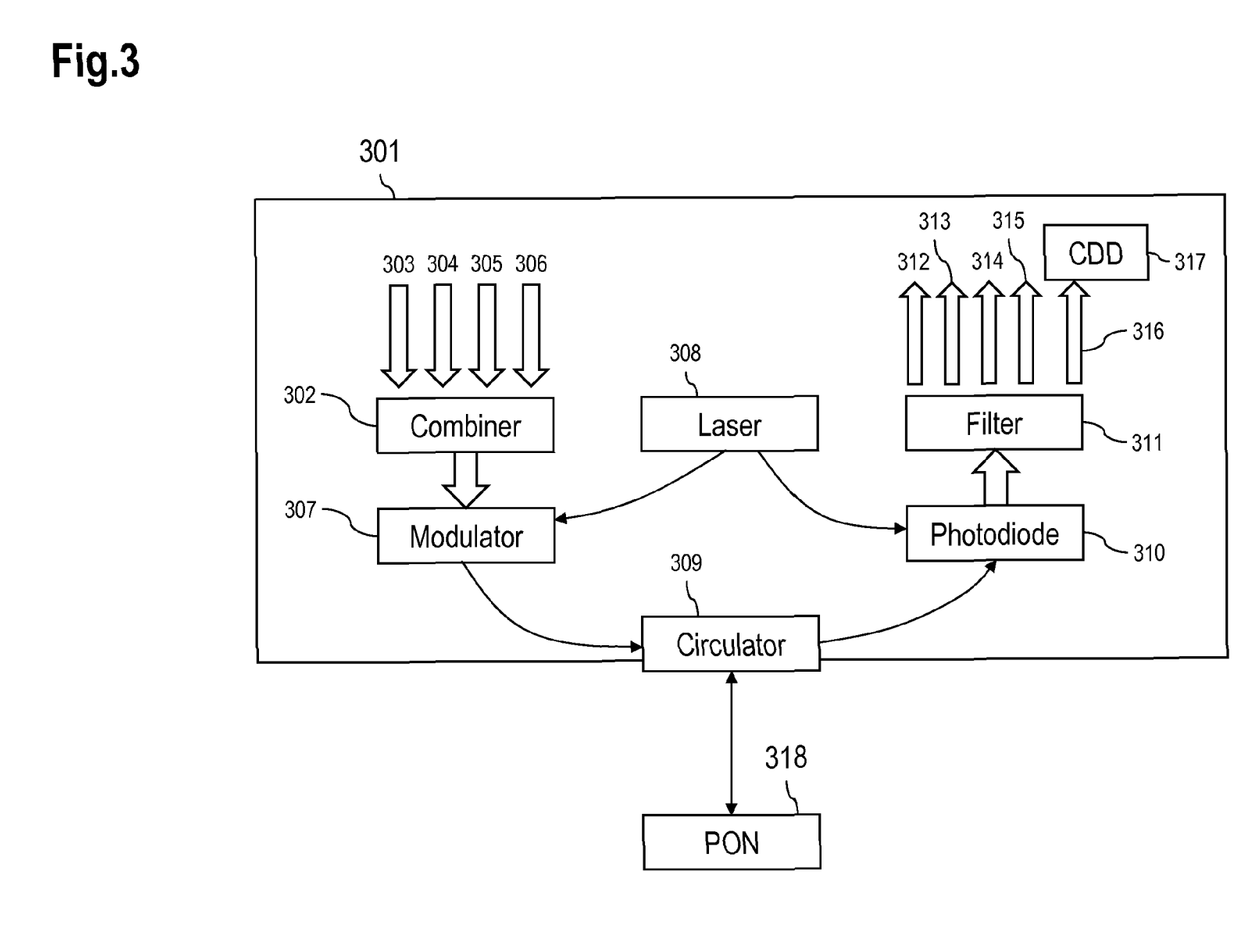
FIG. 3 shows a schematic block diagram of an OTG that is connected to a PON.

FIG. 3 shows a schematic block diagram of an OTG that is connected to a PON.

In an OTG 301, several channels 303 to 306 are combined via a combiner 302 and are fed to a modulator 307. A laser 308 conveys its signal to the modulator 307 and is used as a local oscillator for modulating the signals of the combiner 302. The output of the modulator 307 is fed to a circulator 309 which conveys outgoing signals towards a PON 318. Incoming signals are fed from the PON 318 to the circulator 309 and further together with the signal of the laser 308 to a photodiode 310. The signal is separated by a filter 311, in particular by a set of electrical bandpass filters into several channels 312 to 315, wherein one signal is determined as a collision detection signal 316, which is fed to and evaluated by a collision detection device 317.

The laser 308 may be an unmodulated continuous-wave (CW) laser. The signal of the laser 308 is used as local oscillator for the heterodyne receiver by the photodiode 310. The photodiode 310 converts the optical signal into an electrical signal comprising a sum of all upstream signals, in this example the signal of the channels 312 to 315. The (electrical) filter separates the different upstream signal from each other.

The CDD 317 reacts on upstream light that is provided by at least one ONU, which that is logged in to a neighbor linecard. For example, if the wavelength range of a linecard amounts to +/−10 GHz, the CDD 317 is capable to detect light at +/−12 GHz. Therefore the CDD 317 can trigger a signal 2 GHz before an actual collision occurs.

During operation, both the first and the second linecards may drift. If a new collision occurs or is imminent, the second linecard can be tuned away from the first linecard (i.e. a second set of wavelengths utilized by the second linecard can be adjusted such that a predetermined band gap to a first set of wavelengths utilized by the first linecard is maintained; as each set of wavelengths is associated with a laser setting, this laser can be tuned to adjust the band gap between two sets of wavelengths). It may not be possible to tune the first linecard, because the first linecard may utilize wavelengths at the end of a tuning range, as indicated above.

When the wavelength range of the second linecard is being adjusted, the ONUS that are logged to this second linecard may follow the linecard and no traffic disruption occurs. Therefore, the tuning or adjustment of the wavelength range has to be conducted at a slow speed to allow the ONUs to follow such adjustment.

When the available channels of the second linecard are depleted, the OLT may activate the next linecard following the same scheme.

If more than two linecards are activated and a collision occurs between the first and the second linecard, tuning of the second linecard may inflict a collision between the second and a third linecard, which may result in a tuning of the third linecard as well. In such a case, the OLT may stop tuning of the lower number linecard(s) until the tuning of the higher number linecard(s) is completed.

During normal operation, two linecards may drift away from each other. Therefore, from time to time, the OLT may tune the linecards towards each other until a collision is imminent or detected. This guarantees an optimized, e.g., minimum, spacing between the sets of wavelengths used by the linecards.

Preferably, the highest and the lowest wavelength of a linecard are occupied to allow the neighboring linecards to detect the collision, because the collision detector needs the upstream light to detect a collision. If a subscriber disconnects from such an outer wavelength, another subscriber may thus advantageously be moved to this outer wavelength to guarantee the efficient operation of the collision detectors. This subscriber to be moved can be taken from the linecard with the highest number. If this linecard is "empty", i.e. without any subscribers logged on to it the linecard with the highest number can be deactivated.

The CDD can be implemented in various ways. One exemplary realization comprises a peak signal detector.

Because of the nature of a heterodyne receiver the same collision detection channel can detect a collision with an upper and a lower neighboring linecard. The CDD may not be able to decide by itself whether the collision happens at the upper or the lower end of the wavelength range. Therefore the OLT may combine the collision detect signals from several (all) of its OTGs to make such a decision. If, for example, a collision is signaled by both OTG4 and OTG5, the collision occurred between OTG4 and OTG5.

Approach (b)

An alternative method is to use a heterodyne receiver mixing downstream signals from different OTGs.

Hence, each OTG has a separate output for the unmodulated laser signal. All of these outputs are combined with power splitters and guided to a separate CDD.

The CDD comprises a photodiode, a filter, a rectifier and a threshold detector. Whenever sets of wavelengths of two OTGs collide, the photodiode mixes the corresponding OTG laser signals and produces an intermediate frequency corresponding to the optical distance of both OTGs. The CDD detects this intermediate frequency and signals a collision.

There are two ways for the OLT to determine which OTGs collide:

The OLT can tune an arbitrary OTG; if this tuning is visible in the CDD, this OTG is part of the collision.
The OTG lasers can be modulated with a low frequency pilot tone. Every OTG has a different pilot tone. In the CDD the pilot tones of both colliding OTGs are visible and can be detected easily with low frequency signal processing.

The CDD is a single source of failure for the OLT. To improve reliability, the OLT may be equipped with two or more CDDs.

Figure 4:
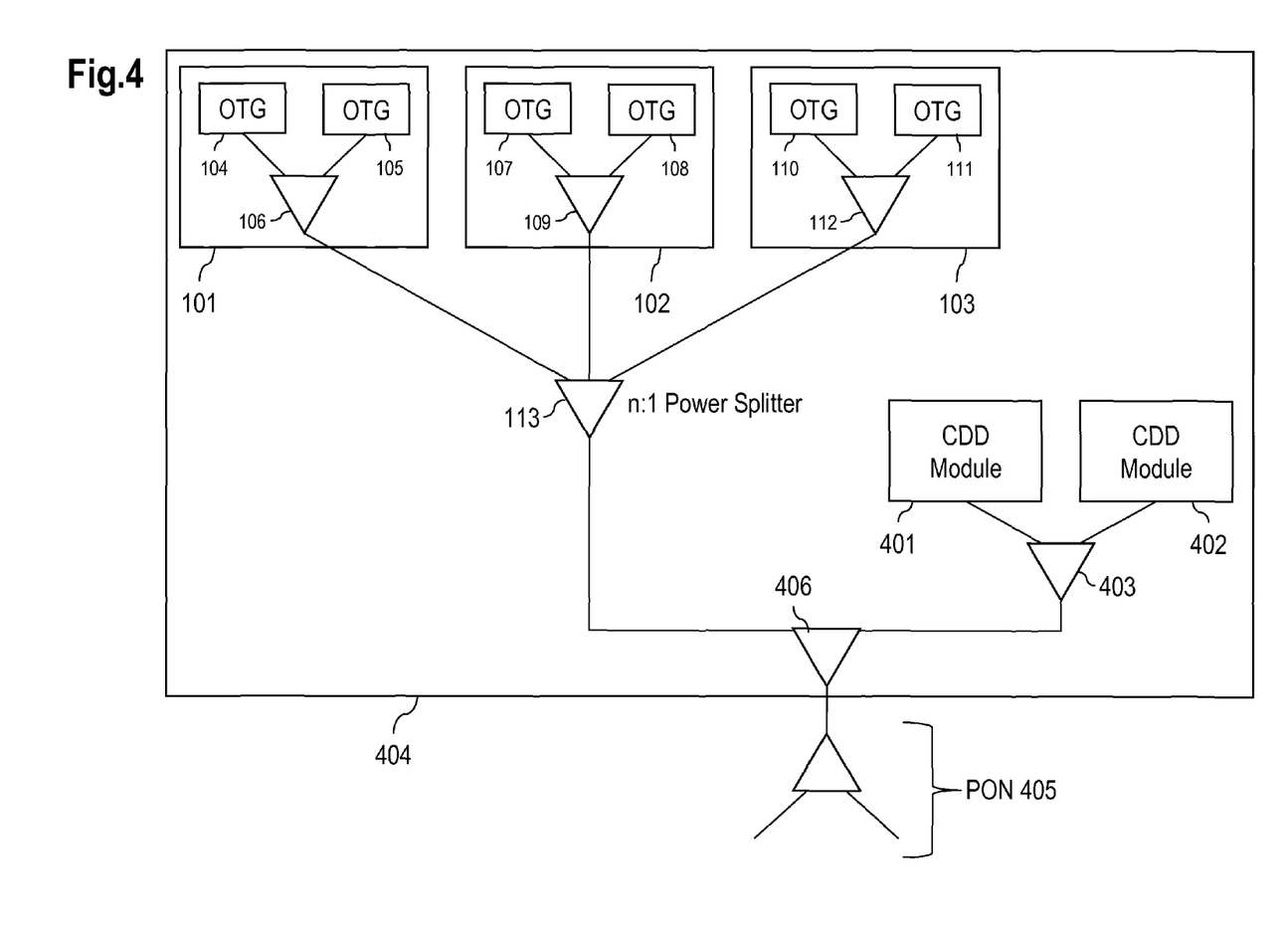
FIG. 4 shows a block diagram visualizing an OLT comprising three linecards combined by a power splitter and two collision detection device modules.

FIG. 4 shows a block diagram visualizing an OLT 404 comprising three linecards 101, 102 and 103 combined by a power splitter as shown and described in FIG. 1. Also, the OLT 404 comprises two CDDs 401, 402. One CDD is provided for redundancy purposes. The CDDs 401, 402 are combined via a splitter 403; the linecards 101 to 103 and the CDDs are combined via a splitter 406 and are connected to a PON 405.

Approach (c)

Here, an ONU can be used to (iteratively, repeatedly and/or permanently) scan the complete wavelength range. Each ONU can act as a spectrum analyzer due to its tunable laser and heterodyne receiver. The ONU's laser may have the same or even a larger drift or higher tolerances than the laser of the OTG. Therefore, the ONU may not determine the absolute position of the OTG's downstream signals. Nevertheless the ONU can determine the relative position between OTGs.

The ONU may scan the complete wavelength range at a constant tuning speed. Whenever it scans over the wavelength bundle of an OTG it calibrates its tuning position by logging the wavelength IDs, which are contained in the Almanac signals of every downstream wavelength. Additionally it knows the fixed distance between two adjacent wavelengths of one OTG (for example 3 GHz) and can simply compare such a distance inside an OTG with the distance between two OTGs. As long as the distance between two OTGs is larger than the distance inside an OTG, no collision occurs.

This dedicated ONU may have to transfer its results of the scanning process to the OLT, which can be done utilizing at least one of the following mechanisms:

1) Whenever the ONU scans a free wavelength which is not occupied by a subscriber, the ONU logs in and uses this wavelength to convey its upstream data to the OLT.
2) The dedicated ONU has a dedicated, reserved wavelength. Whenever the ONU scans over this reserved wavelength, it logs in to the OLT and transfers the data upstream to the OLT.
3) The ONU is physically located near the OLT and has a direct connection, e.g. over Ethernet. It uses this maintenance channel to communicate with the OLT, e.g., permanently.

Approach (d)

Here, an unmodulated downstream signal of the OTG is fed to a further heterodyne receiver. A tributary port of the PON is fed to the same receiver; hence, a photodiode of this receiver obtains all downstream signals of all OTGs as well as a signal of its own laser.

Figure 5:
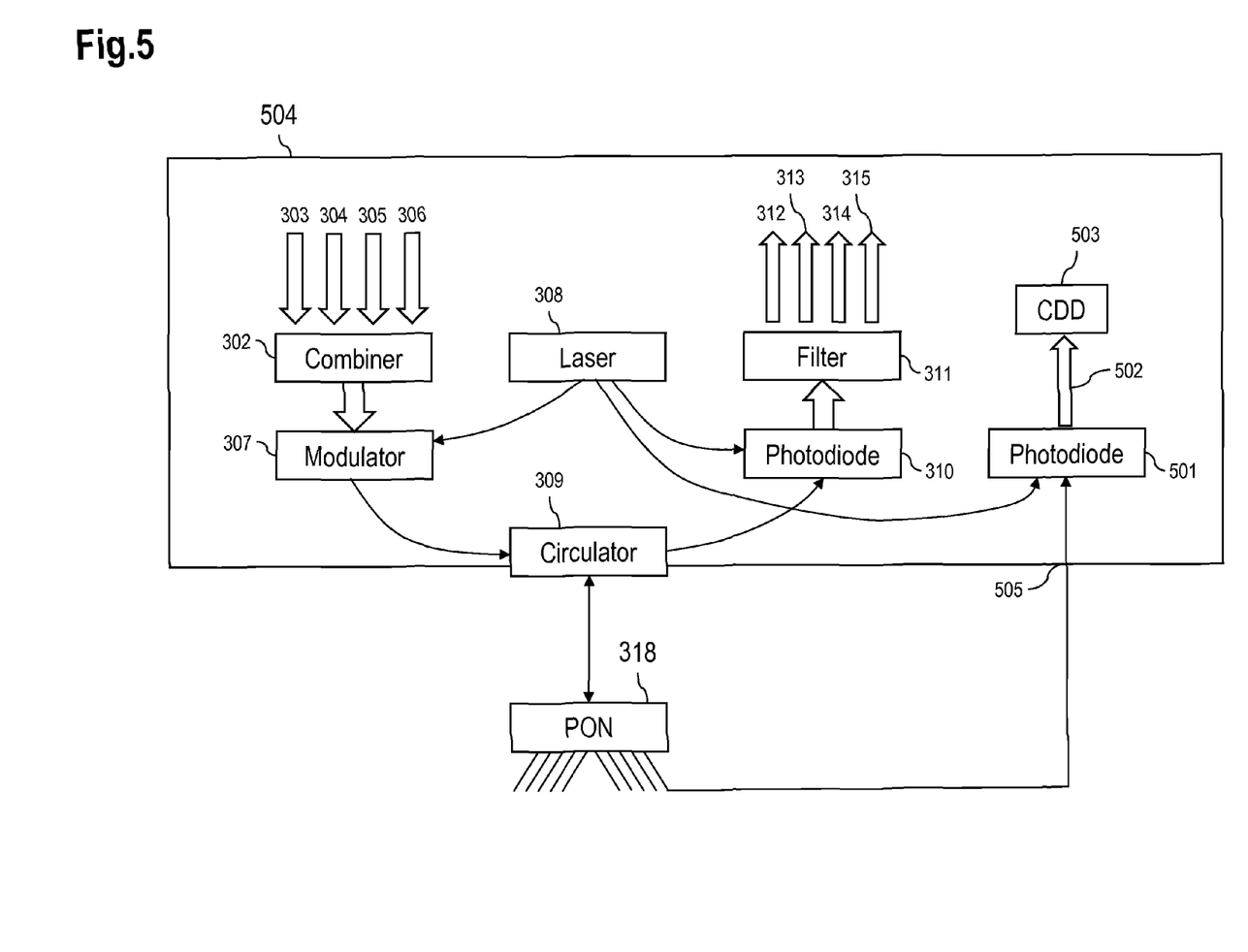
FIG. 5 shows a schematic block diagram of an OTG that is connected to a PON, wherein the OTG has a separate photodiode that is fed by the laser of the OTG and the PON thereby receiving all upstream signals of various OTGs.

FIG. 5 shows a schematic block diagram of an OTG 504 that is connected to a PON 318. The OTG 504 is based on the OTG 301 as shown in FIG. 3 and explained above. However, in contrast to FIG. 3, FIG. 5 shows a separate photodiode 501 that is fed by the laser 308 and via the PON 318 thereby receiving all upstream signals of various OTGs. The output 502 of the photodiode 501 is fed to a CDD 503.

Intermediate frequencies that are visible at the electrical port of the photodiode 502 can be based on one of the following:

1) On an intermodulation between the local OTG laser 308 and the downstream signal of other OTGs.
2) On an intermodulation between the different sub-carriers of another OTG.

Both types of intermodulation have overlapping frequency ranges and cannot be differentiated by frequency. Hence, the laser 308 may have a significantly higher amplitude at the photodiode 501 than any downstream signal from an OTG. This can be achieved by the inherent attenuation of the PON. If the splitting ratio of the PON is very low, the power level at the OTG collision input 505 may be reduced by an attenuator.

Therefore, the intermodulation between the local laser 308 and OTG signal from the PON has a higher amplitude than any intermodulation between OTG signals received at the photodiode 501. Hence, the intermodulation between the local laser 308 and the OTG signal can be detected at the CDD 503.

There are multiple intermodulations between the signal from the local laser 308 and OTG signals:
Intermodulation with downstream signals of this OTG;
Intermodulation with signals from the next OTG;
Intermodulation with distant OTGs.

A differentiation between these intermodulations can be achieved via frequency: The intermodulation with the own downstream signals occurs at fixed frequencies. For example if the OTG has a bandwidth of +/−10 GHz, all of these intermodulations have a frequency below 10 GHz.

Any collision with a neighboring OTG could be defined as an event, when a guard band between two OTGs is reduced to 3 GHz or less. In this case, the intermodulation frequency is 13 GHz in case of a collision.

The intermodulations with more distant (regarding a distance in the frequency band) OTGs all have much higher frequencies. As a result a band pass filter with a mid frequency of 13 GHz can be used in the CDD to detect the collision.

List of Abbreviations
CD Collision Detection
CDD Collision Detection Device
CW Continuous Wave
LIC Linecard (also: Line Interface Card)
LO Local Oscillator
NGOA Next Generation optical access
NGOA Next Generation Optical Access
OAM Operation, Administration and Maintenance
OLT Optical Line Termination (carrier side)
ONU Optical Network Unit (subscriber side)
OTG Optical Transmission Group
PON Passive optical network
UDWDM ultra-dense WDM
WDM wavelength division multiplex

The invention claimed is:

1. A method for data processing in an optical network,
wherein two sets of wavelengths are allocated;
wherein at least one set of wavelengths is monitored;
wherein a collision between the two sets of wavelengths is avoided or compensated by adjusting at least one laser of an optical component; and
wherein a downstream laser signal of the optical component is mixed with an upstream light of at least one adjacent optical component to produce a mixed signal and wherein a collision detection signal is determined by the optical component based on this mixed signal.

2. The method according to claim 1, wherein the optical component is or is associated with one of the following:
an optical line terminal (OLT);
an optical network unit (ONU);
an optical transmission group, (OTG).

3. The method according to claim 1, wherein each set of wavelengths is associated with one laser of an optical component, in particular with an optical transmission group (OTG).

4. The method according to claim 1, wherein the collision is avoided or compensated by determining an optical gap between the at least two sets of wavelengths and by adjusting at least one laser of an optical component when the optical gap reaches a predetermined threshold.

5. The method according to claim 1, wherein downstream laser signals of several optical components are mixed to a collision detection signal.

6. The method according to claim 5, wherein said collision detection signal is fed to a centralized collision detection device.

7. The method according to claim 6, wherein several centralized collision detection devices are provided in parallel.

8. The method according to claim 1, wherein an optical network unit scans downstream signals of several sets of wavelengths and determines a collision detection signal.

9. A method for data processing in an optical network,
wherein two sets of wavelengths are allocated;
wherein at least one set of wavelengths is monitored;
wherein a collision between the two sets of wavelengths is avoided or compensated by adjusting at least one laser of an optical component;
wherein the optical network unit determines a distance between two adjacent wavelengths of a set of wavelengths and a distance between two sets of wavelengths and determines a collision if the distance between the two sets of wavelengths is less than the distance between two adjacent wavelengths of the set of wavelengths.

10. The method according to claim 9, wherein the optical network unit transmits the collision detection signal upstream to an optical access point, in particular to an optical line termination.

11. A method for data processing in an optical network,
wherein two sets of wavelengths are allocated;
wherein at least one set of wavelengths is monitored;
wherein a collision between the two sets of wavelengths is avoided or compensated by adjusting at least one laser of an optical component;
wherein a downstream laser signal of the optical component is mixed with a downstream light of at least one adjacent optical component to produce a mixed signal and wherein a collision detection signal is determined by the optical component based on this mixed signal.

12. The method according to claim 1,
wherein the two sets of wavelengths comprise a first set of wavelengths that is associated with a first laser and a second set of wavelengths that is associated with a second laser;
wherein the second set of wavelengths is tuned via the second laser towards the first set of wavelengths.

13. An optical component comprising
a local oscillator laser emitting a set of wavelengths;
the laser emitting a downstream laser signal
a photodiode in which the downstream laser signal is mixed with an upstream signal from an adjacent optical component to produce a mixed signal;
a processing unit that is arranged for monitoring the set of wavelengths;
for adjusting the local oscillator laser in case the set of wavelengths collides or is about to collide with another set of wavelengths; and
for determining a collision detection signal based on the mixed signal.

14. An optical communication system comprising at least one optical component according to claim 13.

* * * * *